(12) United States Patent
Ishigami

(10) Patent No.: US 6,944,472 B1
(45) Date of Patent: *Sep. 13, 2005

(54) CELLULAR PHONE ALLOWING A HAND-WRITTEN CHARACTER TO BE ENTERED ON THE BACK

(75) Inventor: Masahiro Ishigami, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/532,235

(22) Filed: Mar. 22, 2000

(30) Foreign Application Priority Data

Mar. 26, 1999 (JP) .................................. 11-083646

(51) Int. Cl.⁷ ................................................ H04M 1/00
(52) U.S. Cl. ............................ 455/550.1; 455/575.1; 455/566; 455/575.4; 345/780; 345/702
(58) Field of Search .......................... 455/550, 575, 455/9, 566; 345/780, 702; 405/550.1, 556.1, 556.2, 566, 575.1, 575.4, 575.3, 575.8, 90.2, 90.3, 90.1

(56) References Cited

U.S. PATENT DOCUMENTS

| 5,436,954 | A | | 7/1995 | Nishiyama et al. | |
|---|---|---|---|---|---|
| 5,729,219 | A | * | 3/1998 | Armstrong et al. | 341/20 |
| 5,786,776 | A | * | 7/1998 | Kisaichi et al. | 341/23 |
| 6,211,858 | B1 | * | 4/2001 | Moon et al. | 345/771 |
| 6,225,976 | B1 | * | 5/2001 | Yates et al. | 345/156 |
| 6,349,220 | B1 | * | 2/2002 | Prior et al. | 455/566 |
| 6,415,165 | B1 | * | 7/2002 | Ishigami | 455/566 |

FOREIGN PATENT DOCUMENTS

| CN | 1207524 A | | 2/1999 | |
|---|---|---|---|---|
| GB | 2328343 | * | 2/1999 | ............ H04M/1/02 |
| GB | 2330982 | | 5/1999 | |
| GB | 2339505 | | 1/2000 | |
| JP | 59-121484 | | 7/1984 | |
| JP | 7-121302 | | 5/1995 | |
| JP | 8-5763 | | 1/1996 | |
| JP | 9-115385 | | 5/1997 | |
| JP | WO 98/06176 | | 2/1998 | |
| JP | 10-164205 | | 6/1998 | |
| JP | 10-186069 | | 7/1998 | |
| JP | 09-120960 | * | 11/1998 | ............ H04B/1/06 |
| JP | 11-17791 | | 1/1999 | |
| JP | 11-68896 | | 3/1999 | |

OTHER PUBLICATIONS

"NEC Press Release," NEC, May 1998, all.*

* cited by examiner

Primary Examiner—Nick Corsaro
Assistant Examiner—Alan T. Gantt
(74) Attorney, Agent, or Firm—Scully, Scott, Murphy & Presser (57) ABSTRACT

A touch panel is provided on the back of a mobile terminal which has a display area and an operation entry part on its front. The mobile terminal is configured to allow a user to press the touch panel with a finger, which supports the mobile terminal on the back thereof, to enter information. Information entry is done by entering the locus of a character or a graphic or by selecting from items displayed on a screen in the display area. In addition, the mobile terminal is configured to allow the user, through the touch panel, to control the scroll of the screen.

10 Claims, 10 Drawing Sheets

SEARCH TELEPHONE DIRECTORY

RETURN　　　　ACCEPT

FIG.4(b)

ENTER CHARACTER

お

RETURN　　　　ACCEPT

FIG.4(c)

ENTER CHARACTER

お (0)

RETURN　　　　ACCEPT

FIG.4(d)

SELECT

大井一郎
(OOI ICHIRO)
大阪次郎
(OOSAKA JIRO)
岡島花子
(OKAJIMA HANAKO)
大村太郎
(KIMURA TARO)
高崎六郎
(TAKASAKI ROKURO)

RETURN　　　　ACCEPT

FIG.4(e)

SELECT

大井一郎
(OOI ICHIRO)
大阪次郎
(OOSAKA JIRO)
岡島花子
(OKAJIMA HANAKO)
大村太郎
(KIMURA TARO)
高崎六郎
(TAKASAKI ROKURO)

RETURN　　　　ACCEPT

FIG.4(f)

MAKE A CALL

大阪次郎
(OOSAKA JIRO)
0123-4567-890
日本電気
(NEC CORPORATION)
本社・企画部
(PLANNING DIVISION, HEAD OFFICE)

RETURN　　　　ACCEPT

CELLULAR PHONE ALLOWING A HAND-WRITTEN CHARACTER TO BE ENTERED ON THE BACK

FIELD OF THE INVENTION

The present invention relates to a mobile terminal, and more particularly to a mobile terminal which may be easily reduced in size.

BACKGROUND OF THE INVENTION

Mobile terminals have become very popular these days and many functions are installed on PHSs (Personal Handyphone System), cellular phones, and other mobile terminals that can be used in communication as mobile stations. The setting of these functions and the selection of operations are done through switches or a keyboard provided on the terminal, for example, by selecting items from a menu. On the other hand, the need to make the terminal small and lightweight reduces the area available for the switches and the keyboard, limiting the number of switches and keys which will be required for implementing sophisticated functions.

Figure 10:
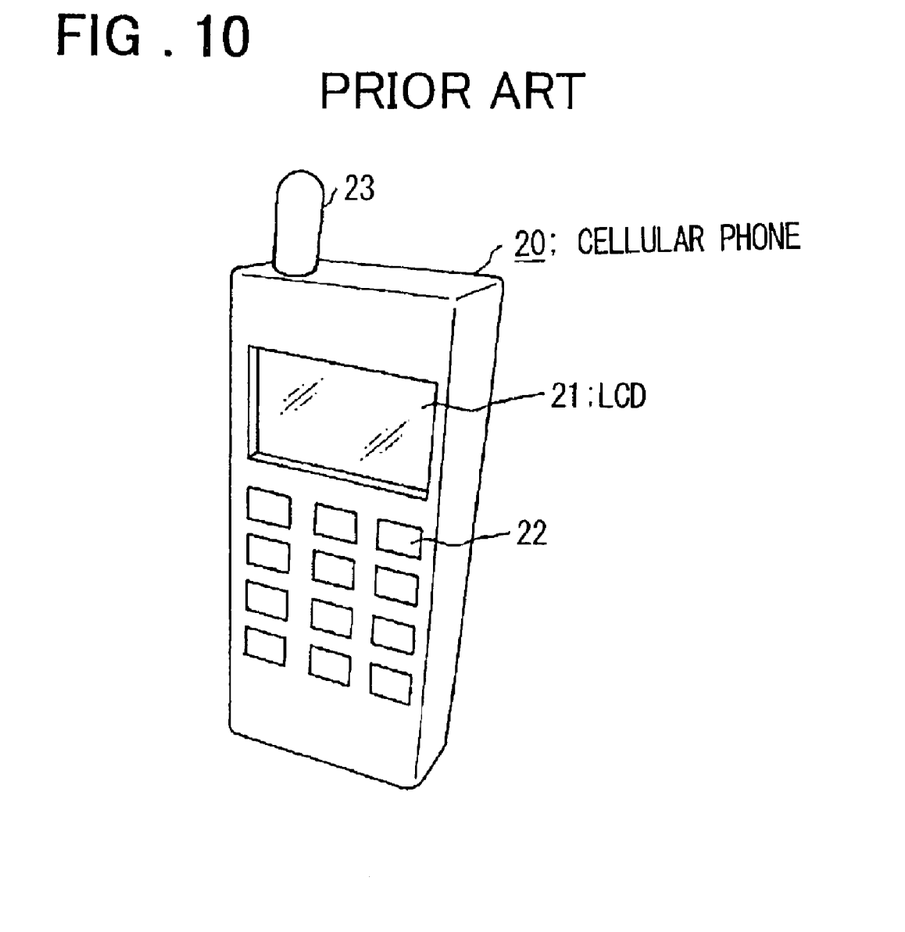
FIG. 10 shows a conventional cellular phone.

FIG. 10 is a perspective view of a conventional cellular phone. Referring to FIG. 10, an LCD (Liquid Crystal Display) 21 displays information thereon and an operation area 22 comprises switches (buttons), a ten-key pad, and so on, to allow characters to be entered by pressing keys multiple times.

For example, one key is allocated to the "A" あ row (meaning a first row of the Japanese "Hiragana" syllabary). This key is pressed once to enter "A", twice to enter "I" い, three times to enter "U" う, four times to enter "E" え, and five times to enter "O" お. In many cases, 10 to 12 keys are arranged to serve both as Hiragana character entry keys and numeric keys.

SUMMARY OF THE DISCLOSURE

As described above, while more and more functions are installed in a cellular phone recently, the operation area, such as the keyboard, is reduced in size to meet the need to make the phone compact. However, as the amount of information to be displayed increases, the need arises to increase the display (LCD) size.

However, an attempt to reduce the operation area to increase the size of the display will make it difficult for the user to do smooth operation, such as keyboard operation, with fingers.

That is, there is a need to make the cellular phone compact and, at the same time, to enable the user to do smooth operation.

The present invention seeks to solve the problems associated with the prior art described above. It is an object of the present invention to provide a cellular phone which makes better use of the display area and the operation area to reduce the phone size and, at the same time, to increase operability.

According to one aspect of the invention, there is provided a mobile terminal comprising: a touch panel on a back thereof; and means for recognizing a hand-entered information entered from the touch panel. Typically the hand-entered information comprises hand-written character.

Typically, the cellular phone according to the present invention has a touch panel (screen pad) on the back to allow a user to enter a locus of a character or graphic by stroking the touch panel with a finger to enter information.

The cellular phone according to the present invention is configured so that the user can not only enter hand-written characters but also scroll a pointer or display information vertically or horizontally through input from the touch panel. In addition, based on an entry operation through the touch panel, the user can select a choice from a function menu or an item from a plurality of information items.

According to a second aspect of the invention, a mobile terminal has a touch panel on the back which is the opposite side of the front where an operation entry part (area) and a display area are provided. For use when a user holds the mobile terminal with a hand and enters a hand-written character (or graphic, sign, symbol or mark, generally termed therein as "character") with a finger of the hand holding the terminal, the terminal comprises a recognizing device for recognizing the hand-written character entered from the touch panel and a screen for displaying the recognized character in the display area.

For use when the user touches the touch panel with the terminal in one hand and moves (slides or strokes) a finger on the touch panel, the mobile terminal according to the present invention may further comprise means (device) for detecting finger movement on the panel to move a cursor pointer according to the finger movement on (along) the touch panel. The terminal according to the present invention may further comprise a scrolling device for scrolling the display screen in the display area vertically or horizontally as the user touches the touch panel and moves the finger on it vertically and horizontally.

The mobile terminal according to the present invention may further comprise a selecting device for selecting an item from the display area or scrolling the display screen according to a position at which, or a manner (locus etc.) in which, the user touches the touch panel.

According to a third aspect of the invention, the mobile terminal is configured to allow a user of the mobile terminal to enter information from the back of the mobile terminal by touching and stroking, or pressing, the touch panel with a finger (e.g., index finger) of a hand holding the mobile terminal and, to press a predetermined key disposed in an operation entry part (e.g., front or side wall side) of the mobile terminal using some other finger of the hand.

According to a fourth aspect of the invention, there is provided a mobile terminal with an operation entry part and a display area on a front thereof. The mobile terminal comprises a main housing, a touch panel provided on a back of the terminal housing to allow a user, while holding the terminal with a hand, to perform an entry operation with a finger of the hand holding the terminal.

The hand-entered information (generally "character", e.g., letters, symbols or graphic) is recognized and displayed by a display disposed n in the display area.

There is provided means for detecting a a touch operation when the user touches and strokes the touch panel and for moving information or a pointer according to a movement of the finger on the touch panel, the information and the pointer being displayed by the display.

Also there is provided means for moving the pointer to a predetermined position according to the movement of the finger on the touch panel when the user strokes the touch panel with the finger and, when the user presses the touch panel in this state, to scroll the display screen in the display area vertically or horizontally.

Further there may be provided means for performing processing according to a position at which, or a manner in which, the user presses the touch panel, the processing corresponding to a single-click or a double-click of a mouse.

Yet more, there is provided means for executing either at least one of selection, acceptance, and cancellation of an item displayed in the display area or a scroll of the display screen, according to a position at which, or a manner in which, the user presses the touch panel.

At least one switch may be disposed on a front of the mobile terminal for controlling acceptance and cancellation of an entry operation through the touch panel, the switch each being provided at a position, when the user holds the mobile terminal with a hand, where the user can press the switch with a finger (e.g., other than the index finger) of the hand holding the mobile terminal.

The type of the hand-entered information or hand-written character entered through the touch panel includes at least one of Japanese kana syllabary (hiragana and/or katakana), (kanji, and alphanumeric letters).

The mobile terminal recognizes the hand-written character (letter) entered through the touch panel during a search of a telephone directory stored in a storage unit with telephone numbers associated with subscriber's information, searches the telephone directory based on a recognition result of a first hand-written character or a predetermined number of characters following the first character, displays candidates obtained as a result of the search, and automatically makes a call to an addressee via an entry operation through the touch panel, the addressee being selected from the candidates displayed in the display area.

There is provided an arrangement of a minute hand and a hour hand of a clock from the graphic information and time information is recognized/displayed from the entered locus.

The mobile terminal assumes a shape which is suitably hold by one hand and easy to manipulate by fingers of the single hand, e.g., an elongated rectangular parallelepiped shape, an elongated box-like or a foldable-type thereof.

BRIEF DESCRIPTION OF THE DRAWINGS

FIG. 4 is a diagram showing display screens illustrating operation steps for directory search on a cellular phone in an embodiment of the present invention.

PREFERRED EMBODIMENTS OF THE INVENTION

Preferred embodiments of the present invention will now be described. In a preferred embodiment, a mobile terminal according to the present invention has a touch panel on its back for use as a data-entering means. This touch panel allows the user, who holds a terminal with one hand, to enter data with one finger of a hand holding the terminal. The mobile terminal has a recognition means recognizing characters written by the finger. In addition, the mobile terminal according to the present invention may comprise a recognizing means recognizing simple graphics entered by the finger through the touch panel.

The mobile terminal according to the present invention also allows the user, through input operation on the touch panel, to move the cursor pointer within the display screen and to scroll the screen vertically and horizontally. In addition, the mobile terminal is configured so that the user, with the terminal held with one hand, can press an operation key on the front of the terminal with the finger of the hand holding the terminal to accept or cancel the operation.

The mobile terminal may also be configured so that the user can enter control information on an Accept key or Cancel key or on the scroll of the screen by controlling how the user presses the touch panel with the finger, that is, how many times consecutively and at what interval the user presses the touch panel, at what point on the touch panel the user presses, or in which direction the user moves the finger.

EXAMPLES

An embodiment according to the present invention will be described with reference to the attached drawings. FIG. 1 is a perspective view schematically showing an outlook of the embodiment which is a cellular phone to which the present invention is applied. It is to be understood that the cellular phone described herein includes a Personal Handyphone System phone.

Figure 1A:
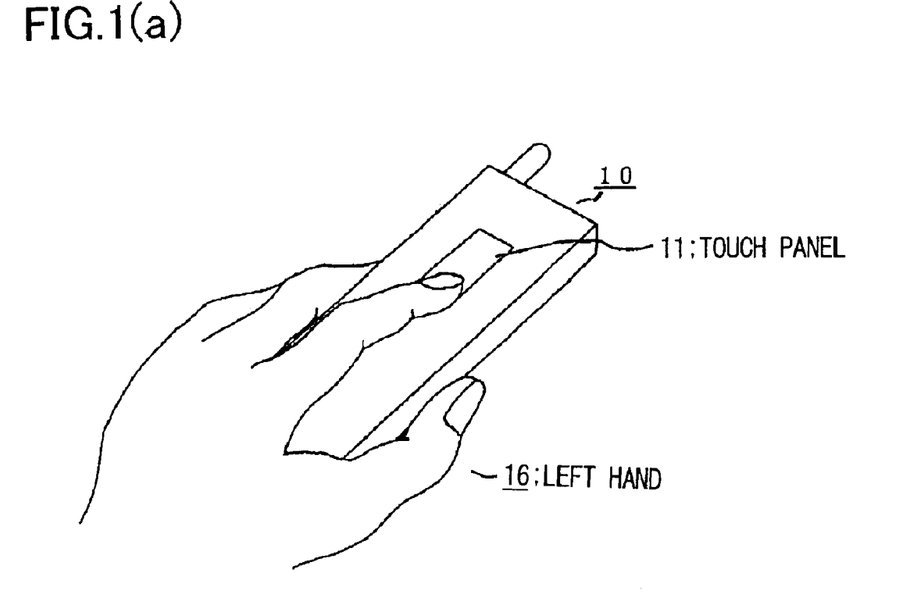
FIG. 1 is a diagram showing an external view of a cellular phone in an embodiment of the present invention.
Figure 1B:
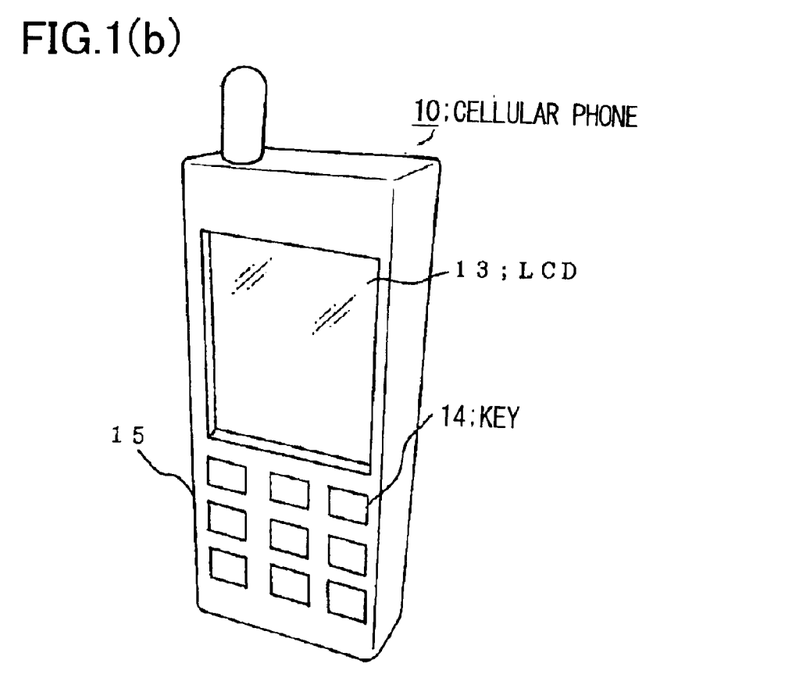

FIG. 1 shows the configuration of the embodiment in which the present invention is applied to a box-shaped cellular phone. FIG. 1(a) is a rear view of the cellular phone. To illustrate how the user operates it, the figure shows the cellular phone held by the user. FIG. 1(b) is an external front view of the cellular phone.

A cellular phone 10 in the embodiment of the present invention has a touch panel 11 on the back which is the opposite of the front where a display (LCD) 13 and a main operation area 14/15 are provided.

As shown in FIG. 1(a), the user holding the cellular phone 10 with one hand 16 can touch the touch panel 11 on the back, for example, with an index finger to enter data.

The touch panel used in an embodiment of the present invention will be described briefly. When the user touches the panel, the resistance of an area on the panel the user touches varies responsive to an applied physical pressure. Although there are many types of touch panels, this embodiment uses a touch-sensitive membrane (e.g., resistance film) panel capable of detecting a finger that touches the panel. For example, reference publication 1 (Japanese Patent Kokai Publication JP-A-9-115385) describes this type of touch panel (or screen).

The touch-sensitive membrane touch panel works such that, when pressure is applied, a circuit at the point of touch is closed to provide a resistance-divided voltage value by which coordinate information is obtained. That is, when the user applies pressure to the touch panel with a finger or a pen with a voltage applied across both ends, resulting voltage values differ from each other depending on which point on touch panel the user touched. This measured voltage value is used to identify the position the user touched.

For example, when the user strokes the touch panel, the position identification operation (processing) is performed continuously in time to obtain information on the direction and the length of the stroke as a vector amount. By correlating the vector amount obtained from the touch panel with the screen information displayed on the display, the touch panel identifies information the user has selected.

A small CPU with a two-channel A/D converter is usually used as a circuit that is connected to the touch panel for position detection. A CPU, if provided in a touch-panel installed device for some other purpose, may also contain the touch panel data processing function. The description given below assumes that a dedicated touch panel entry (input) processor processes data entered from the touch panel.

The touch panel entry processor, used as a component of many devices, is commercially available as a general-purpose IC because there are various needs for the processor. For example, it is used as a processor for allowing the user to select items from the display of a mobile data terminal or a cash dispenser at banks or as a mouse used with a notebook computer. For example, reference publication 2 (product catalog TOUCH SCREEN "Controller AHL-301A" from Gunze Ltd.) contains a list of position detection devices for touch panels.

Also commercially available as LSIs are devices used to input (read) or recognize characters on a touch panel. For example, refer to reference publication 3 (FINPUT product catalog for touch panels"Touch Panel Controller, FIT-S10") etc.

The operation of one embodiment of the present invention will be described.

Figure 2:
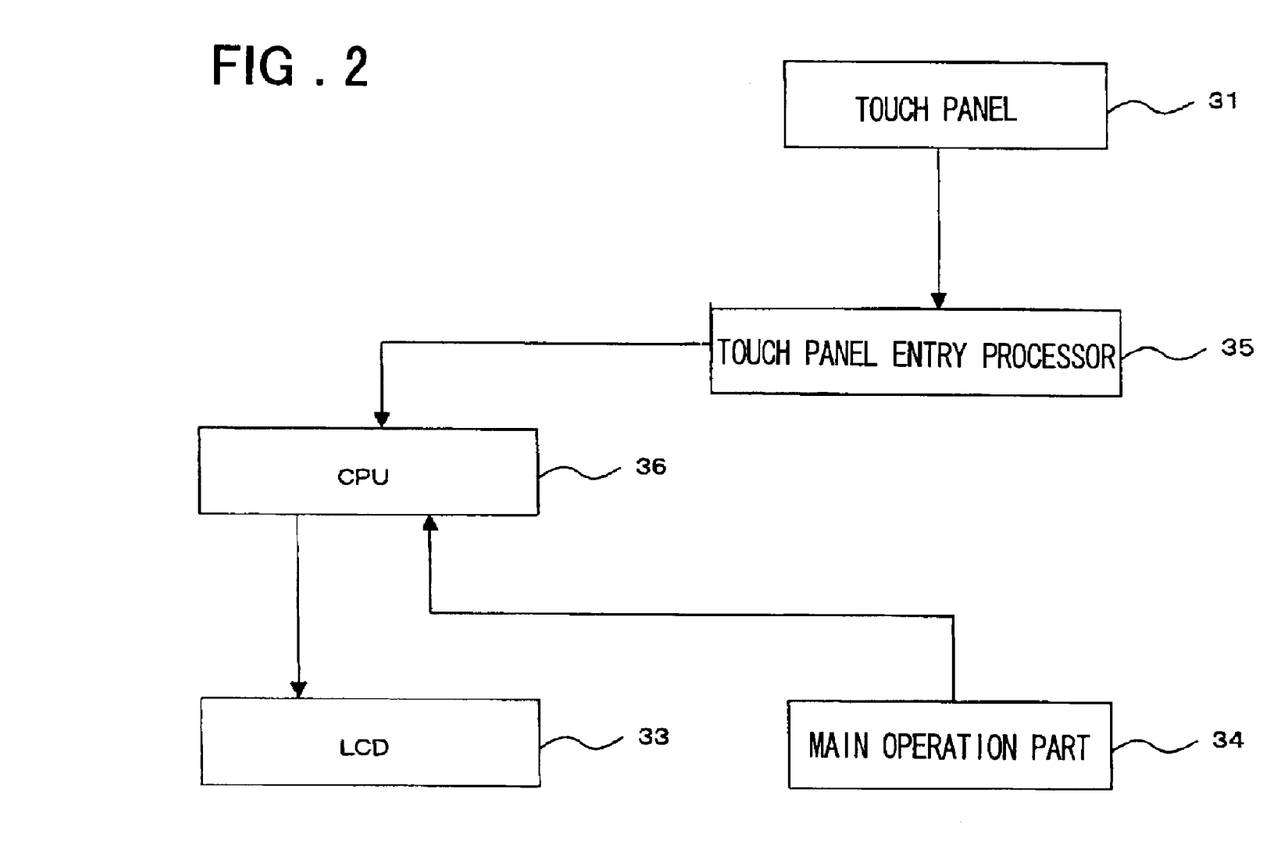
FIG. 2 is a diagram showing a functional configuration of a cellular phone in an embodiment of the present invention.

FIG. 2 is a block diagram showing the functional configuration of an embodiment according to the present invention.

The signal received by a touch panel 31 is sent to a touch panel entry processor 35 for primary processing. The signal sent from the touch panel 31 to the touch panel entry processor 35 is an analog voltage value signal indicating the position on the touch panel 31 the user touched. An A/D converter built in the touch panel entry processor 35 reads this analog voltage periodically, captures it as coordinate values, eliminates unstable data or performs chattering processing, and then recognizes character patterns.

Character pattern recognition generally tends to be complex. However, in an embodiment of the present invention, lines, numbers, hiragana characters, katakana characters, alphabetic characters, and simple graphics (logos, symbols, signs or marks) are recognized as input to the touch panel 31. Therefore, as compared with character pattern recognition in which kanji characters must be recognized, both the hardware and the software used in the embodiment may be simple.

There are many character recognition methods. In general, coordinate information is once read into the touch panel entry processor 35 in a time-series manner and is made to correlate in memory with coordinate values so that it is processed as pixel data during image processing. Then, the characteristics of the processed data are correlated in features with those of character data stored in advance.

The entered information is processed in the touch panel entry processor 35 as described above. The first candidate for the recognized character string is passed to a CPU 36. When a hand-written character is entered, coordinate information for line-drawing used as display feedback data is passed to an LCD 33. When a line is drawn with the finger, vector information is passed to the LCD 33.

To recognize characters, the touch panel entry processor 35 contains an image processing program that meets the purpose. During character recognition processing, one of the known character recognition processing methods is used. For example, reference publication 4 ("Entire of: Image Processing Circuit Technology" in special issue No. 5 of Transistor Technology, particularly, Chapter 15, pp164–175, CQ Publishing, 1977) carries an article on an example of image processing that is executed before character recognition. Also, refer to reference publication 5 ("OCR for Postal Automation", NEC Technical Journal, Vol. 51, No. 11, NEC Corporation, November 1998) etc. as an article on an example of character recognition algorithm. The entire disclosures of the reference publications Nos. 1–5 are incorporated herein by reference thereto.

The LCD (Liquid Crystal Display) 33 is a display on which visual information is displayed.

A main operation part (module) 34 receives key depression (operation information) the user enters through the operation keys 14 and 15 shown in FIG. 1(b).

The CPU 36 controls the display on the LCD 33 and displays the line drawing process (stroke) on the LCD 33 to give a visual feedback to the user.

While giving selection information to the user, the CPU 36 selects information from the operation instructions given from the main operation part 34 and the touch panel entry processor 35.

Figure 3:
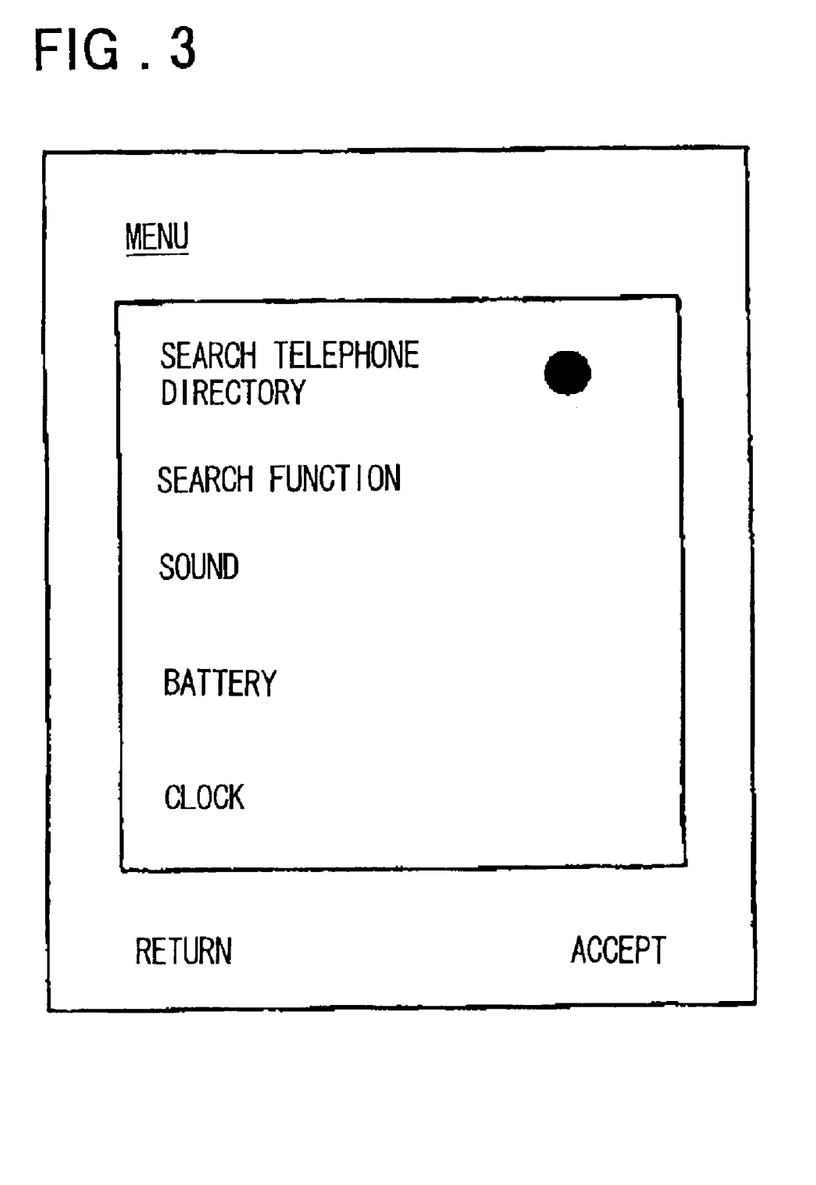
FIG. 3 is a diagram showing a display screen for selecting functions on a cellular phone in an embodiment of the present invention.

FIGS. 3 to 6 show examples of display screen on the LCD 33. They are typical four types of information entry screen of a cellular phone. FIG. 3 shows a display screen for the function selection operation, FIG. 4 shows a display screen for character entry and selection, FIG. 5 shows a display screen for character conversion, and FIG. 6 shows a display screen for the selection operation through graphic entry.

FIG. 3 is a diagram showing an example of the function selection display screen used in one embodiment of the present invention. It shows a standard function selection menu (Search telephone directory, Search function, Sound (volume), Battery, Clock, etc.,) displayed on a cellular phone. Recently, as the cellular phone has more and more functions, it becomes impossible for the user to select all functions on one screen. As a result, as many functions as can be displayed are usually displayed on the display screen in many cases and, for more functions, the user moves the selection icon to select a desired item.

In the display example shown in FIG. 3, when the user moves a finger vertically on the touch panel 31, the CPU 36 gets vector information from the touch panel entry processor 35 and, based on the vector information, moves the round icon or pointer (●), shown on the right side of the characters, vertically on the screen.

When an Accept key is pressed, the information displayed on the row on which the icon is displayed is regarded as selected. Here, the Accept key is the key 15 (somewhere on the left side wall of a casing , not shown) in FIG. 1(b). As shown in FIG. 1(a), the key 15 is a key the user's thumb touches when he or she holds the cellular phone 10 with the left hand as shown in FIG. 1(a). When the user enters a character from the touch panel 11 on the back of the cellular phone 10 with the index finger, the thumb and the opposing index finger work together to do the selection operation and the acceptance operation.

A single press and a double press are defined for the Accept key 15. The single press is to press the key once, while the double press, which is similar to the double click of the button of a mouse on a personal computer, is to press the key twice consecutively at a very short interval to select information. The Accept key 15 is arranged so that the number of keys is kept to a minimum. The key 14 shown in FIG. 1(b) is allocated to a cancel key. These keys are arranged so that all operations may be done with one hand.

FIGS. 4–6 each show a series of operation screens displayed after the user selects a function as shown in the example in FIG. 3. FIGS. 4–6 each show display screens (a)–(f) in the order in which they are displayed.

Figure 7:
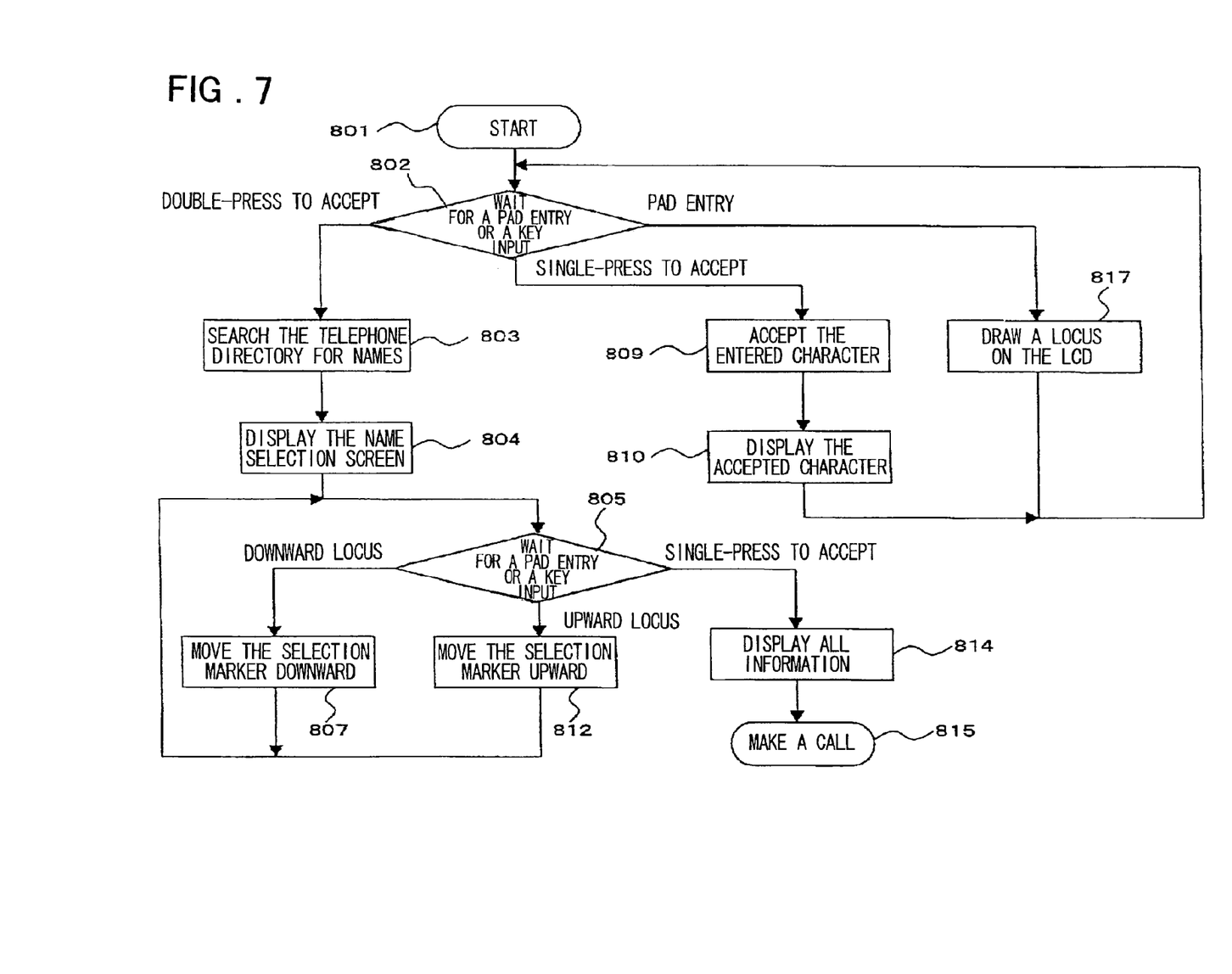
FIG. 7 is a flowchart showing processing steps for directory search on a cellular phone in an embodiment of the present invention.

FIG. 4 is a diagram showing an example of the display screens of the search operation on the telephone directory stored in the memory of the cellular phone. FIG. 7 is a flowchart showing processing steps of the telephone directory search operation. First, referring to FIGS. 4 and 7, the telephone directory search operation will be described.

The telephone directory is a file stored in the memory. The file stores therein the telephone numbers of addressees of telephone connection and the name and attribute of each party. As the amount of stored information increases, it becomes more difficult to search the telephone directory for a desired name or number. For this reason, there is a need for an efficient search function.

In step 802 <WAIT FOR A PAD ENTRY OR A KEY INPUT>, the cellular phone is waiting for the user to stroke the touch panel 31 to enter its locus (called "pad entry") or to press the Accept key 15 shown in FIG. 1(b).

In step 802, the LCD 33 displays a display screen such as the one shown in FIG. 4(a). Because the user has not yet stroked the touch panel 31, nothing is displayed in the box in the center of the LCD 33.

Next, when the user enters a character through the pad in step 802, the CPU 36 draws the locus of the character on the LCD 33 in step 817.

These operations are performed consecutively, and steps 802 and 817 are repeated until the entry of the character is ended. During this period, the touch panel entry processor 35 accumulates locus information in a storage unit in preparation for character recognition that will be performed next.

FIG. 4(b) shows an example of display when one character has been entered. In the figure, the locus that can be recognized as "お" (O) is drawn.

At this time, if the user "single-presses" the key in step 802, the touch panel entry processor 35 accepts the character in step 809 to recognize the character. That is, the touch panel entry processor 35 recognizes the Hiragana or Katakana character most similar to the entered character and informs the CPU 36 of the recognized character. The CPU erases the locus as shown in FIG. 4(c) and displays the recognized character in the special box at the bottom in step 810. Then, control returns to step 802 and waits for the user to enter the next character through the pad or to press the key. (Note, the character may be Alphabet or else, any kind of language.)

When the next character is entered immediately after the previous character, the newly-recognized character is displayed immediately to the right of the previously-recognized character in step 810.

Although a step for the key 14 is omitted in the flowchart in FIG. 7 for sake of simplicity, the user may press the key 14 to return to the previous selection status to repeat processing.

In the description below, it is assumed that a character entered via the touch panel is the Japanese equivalent (Hiragana or Katakana) to the first character of the name belonging to a telephone number registered in the telephone directory. In searching the telephone directory, the first digit of a telephone number or two or more (multiple) characters may be used. In either case, the telephone directory may be searched by changing the recognized character and the search processing method.

Because the first character "お" (O) is recognized in the search by name in the above example, the user "double-presses" the key to move to the telephone directory search processing in step 803.

In step 803, the telephone directory is searched and the names with Japanese equivalent "お" (O) are searched for in the order of Japanese syllabary (i.e., Japanese alphabet letters). In step 804, the name selection screen is displayed. The search result, as well as the selection icon, is displayed as shown in FIG. 4(d). The selection marker is represented as "●".

In step 805, the cellular phone waits for the user to enter a locus to move the selection icon vertically or to press the Accept key.

When the user enters a downward locus with the index finger, the selection marker moves downward in step 807. On the other hand, when the user enters an upward locus, the selection marker moves upward in step 812.

During this processing, the CPU 36 does not display the locus. Instead, it causes the touch panel entry processor 35 to detect the vector and recognizes in which direction the locus was entered. In response to the entered locus, the selection marker "●" moves vertically on the screen in step 807 or 812.

In FIG. 4(e), a downward locus was entered and the selection marker is moved down by one row. To bring the selection marker outside the display range, that is, to display the next page, the user is required to move the selection marker to the bottom row. Upon detecting this status, the CPU 36 scrolls vertically to display the next candidate.

For the LCD 33 with the horizontal scroll function, the display screen may be configured so that the selection marker may be moved horizontally when the user presses the touch panel with the finger. When all information is not displayed on one row, the horizontal scroll function causes the display screen to scroll horizontally to allow the rest of information in the row to be displayed When a desired name is displayed and selected, the user presses the Accept key to pass control to step 814 in which all address information is displayed. That is, the telephone number and its related information are displayed on the screen. FIG. 4(f) shows an example of the display.

When the Accept key is pressed, the cellular phone moves to the transmission processing in step 815 to <MAKE A CALL> and enters communication status.

Figure 8:
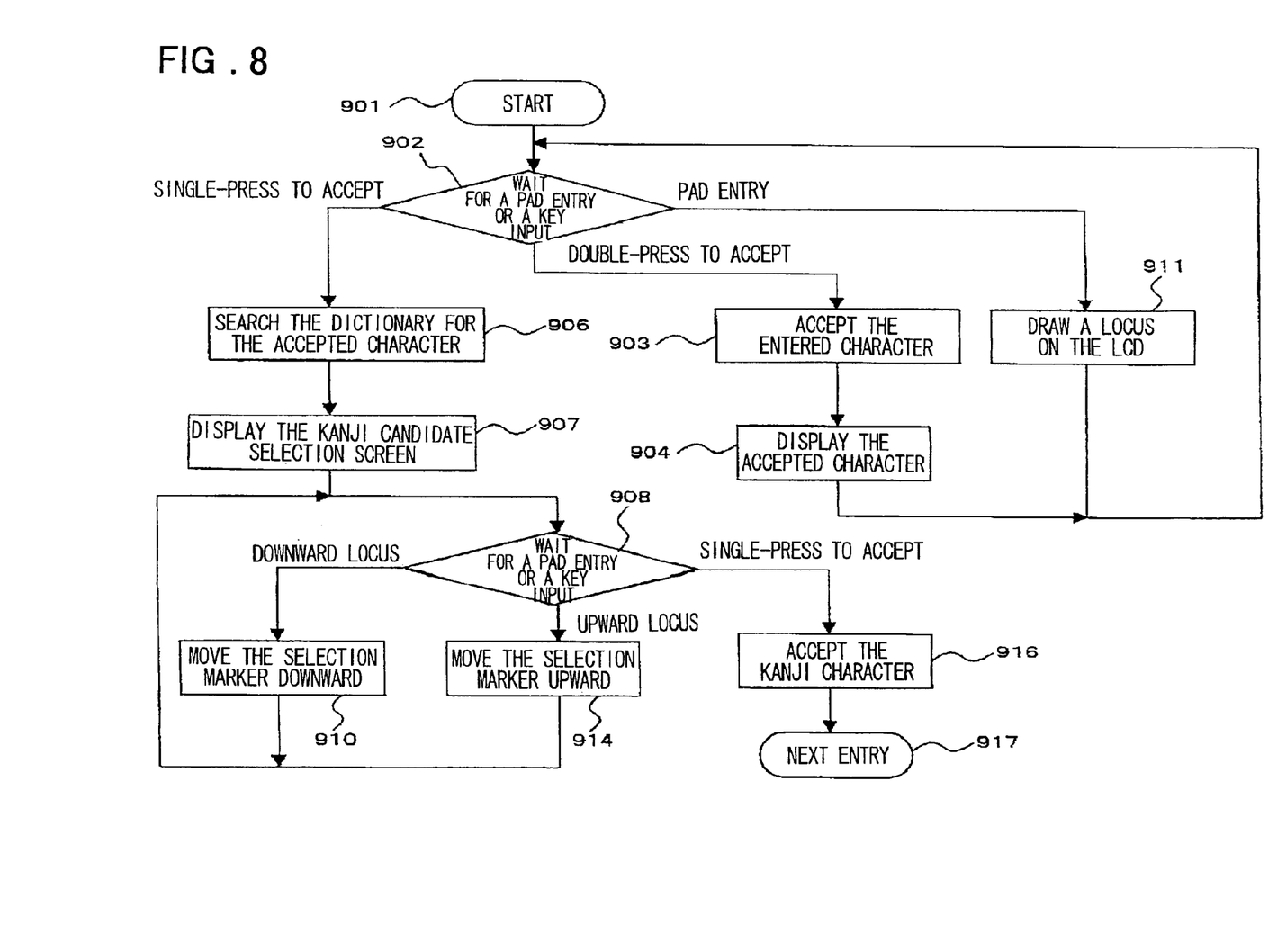
FIG. 8 is a flowchart showing processing steps for Kanji entry on a cellular phone in an embodiment of the present invention.

FIG. 5 is a diagram showing an example of display screens for kanji (Japanese or Chinese characters) entry operation. FIG. 8 is a flowchart showing kanji entry processing.

Next, referring to FIGS. 5 and 8, the kanji entry operation in one embodiment of the present invention will be described.

In step 902, the cellular phone waits for the user to stroke the touch panel 31 with the finger and the locus of the entered kana character to be entered.

When the locus created by stroking the touch panel with the index finger is entered, the CPU 36 draws the a line, corresponding to the locus, on the LCD 33 in step 911. These operations are performed consecutively, and steps 902 and 911 are repeated until the entry of the character is ended.

During this period, the touch panel entry processor 35 accumulates locus information in the internal storage unit in preparation for character recognition that will be performed next.

FIG. 5(*a*) shows an example of display when one character has been entered. In the figure, the locus that can be recognized as "お" (O) is drawn.

Figure 5A:
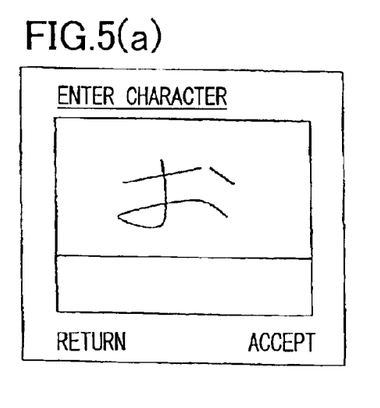
FIG. 5 is a diagram showing display screens illustrating the operation steps for kanji entry on a cellular phone in an embodiment of the present invention.
Figure 5B:
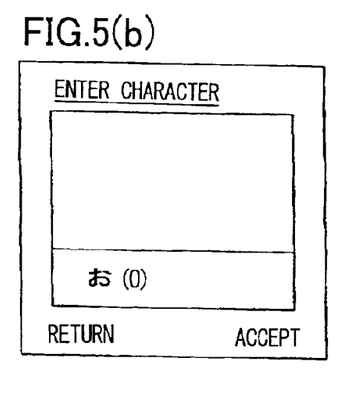
Figure 5C:
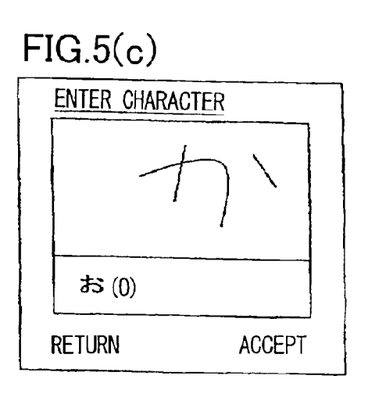
Figure 5D:
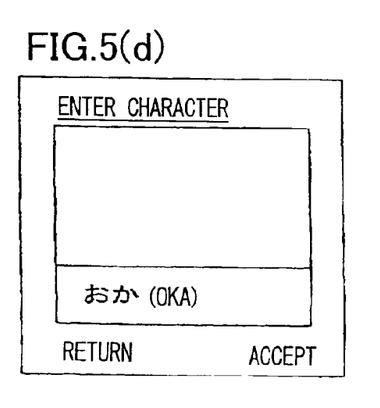

At this time, if the user "single-presses" the key, the touch panel entry processor 35 accepts the character in step 903 to recognize the character. That is, the touch panel entry processor 35 recognizes the hiragana or katakana character most similar to the entered character and informs the CPU 36 of the recognized character. The CPU erases the locusas shown in FIG. 5(*b*) and displays the recognized character in the special box in step at the bottom.

Then, control returns to step 902 and waits for the user to enter the next character through the pad or to press the key.

FIG. 5(*c*) shows an example in which "か" (KA) is entered. FIG. 5(*d*) shows the display when the character is accepted and recognized. The processing flow of each character is the same as that of the character "お" (O) described above.

When the next character is entered immediately after the previous character, the newly-recognized character is displayed immediately to the right of the previously-recognized character in step 904. As a result, the CPU 36 accumulates the characters "おか" (OKA).

Figure 5E:
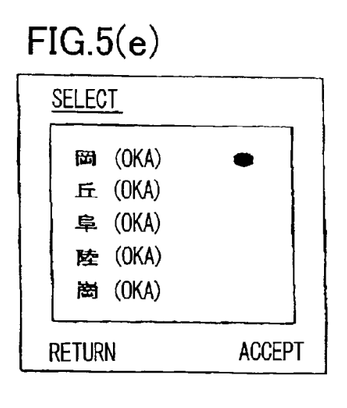
Figure 5F:
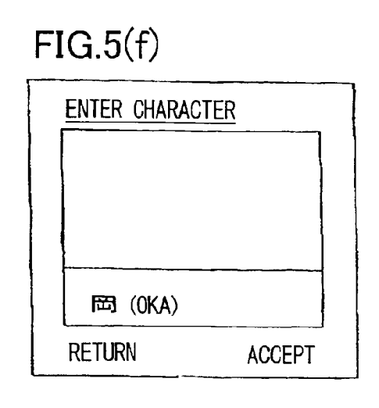

Next, when the user double-presses the key, the CPU 36 searches the dictionary for the two characters "おか" (O-KA). In step 906, the CPU 36 searches the dictionary for the candidates and, in step 907, displays kanji candidates on the screen as the selected candidates. FIG. 5(*e*) shows the screen on which the selected candidates (kanji candidates for the entered characters "おか" (OKA)) are displayed. As shown in FIG. 5(*e*), the selection icon is displayed next to the currently selected candidate to allow the user to select one kanji character from a plurality of candidates. In this example, the selection icon (marker) is represented as "●".

In step 908, the cellular phone waits for the user to enter a vertical locus to move the selection icon vertically or to press the Accept key.

When the user enters a downward locus with the index finger, the selection marker moves downward in step 910. On the other hand, when the user enters an upward locus, the selection marker moves upward in step 914.

Because, in this example, the selection icon "●" is already next to "岡" (OKA) that is the candidate to be selected, the user single-presses the key to move to step 916 to accept the kanji character.

The CPU 36 accumulates the kanji character "岡" (OKA) in the internal memory and, at the same time, displays the character "岡" (OKA) in the box at the bottom as shown in FIG. 5(*f*).

Figure 9:
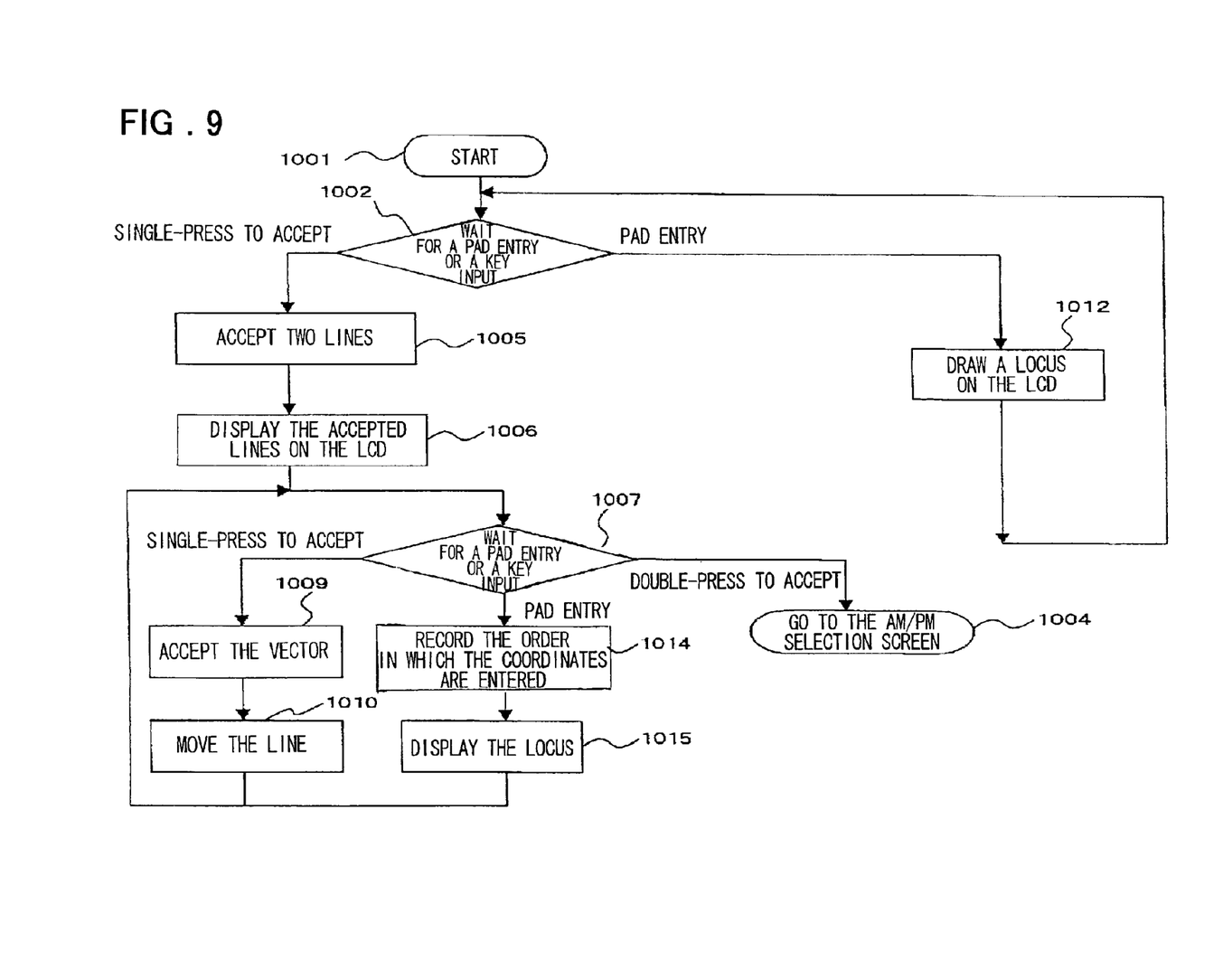
FIG. 9 is a flowchart showing processing steps for time entry on a cellular phone in an embodiment of the present invention.

FIG. 6 is a diagram showing an example of the display screen on which a time is entered in one embodiment of the present invention. FIG. 9 is a flowchart showing the time entry processing.

Referring to FIGS. 6 and 9, the time entry operation in one embodiment of the present invention will be described. This time entry function allows the user to enter the locus of a simple graphic (logo) to set up functional information.

In step 1002, the cellular phone waits for the user to stroke the touch panel 31 with the finger to enter the locus of a simple graphic.

FIG. 6(*a*) is a diagram showing an example of the screen on which the user enters a time. On this screen, the user enters a graphic that looks like a bent nail which indicates the minute hand and the hour hand of a clock. That is, the graphic is treated as the hands of a clock in this embodiment.

The graphic "●" shown in FIG. 6(*a*) is displayed as the center, which represents an axis on which the hands of the analog clock rotate. This graphic makes the user feel easy to enter a time.

When the user stokes the pad with the index finger to enter a locus, the CPU 36 draws on the LCD a line corresponding to the locus in step 1012. These operations are performed consecutively, and steps 1002 and 1012 are repeated until the entry of the simple graphic is ended.

FIG. 6(*b*) shows an example of display when the entry of the simple graphic has been ended.

At this time, when the user single-presses the key, control is passed to step 1005 in which the touch panel entry processor 35 recognizes the two lines. In step 1006, the touch panel entry processor 35 displays them on the LCD and recognizes them the hour and minute hands. More specifically, the processing in this embodiment begins by accepting the two lines.

The area is divided into 12 sectors in the direction of rotation with the center as a base. Then, the locus is represented in terms of dots, and a check is made as to how may dots are present in each sector.

Two sectors containing many dots are recognized as the sectors containing the lines. And, a check is made again for the selected two sectors in terms of the distance from the center. The sector containing dots more distant from the center is assumed to be a sector containing the minute hand with the other sector assumed to be a sector containing the hour hand.

And, as shown in FIG. 6(*c*), these two lines are displayed as accepted straight lines. The digits shown in the bottom area indicate a digital time, meaning that the hour and the minute of the clock have been entered. This information, generated from an entered simple graphic, is not precise and therefore requires fine adjustment for correction.

After step 1006, control is passed to step 1007 to wait for the user to stroke the pad. In the subsequent steps, the user tries to move the graphic of the minute and hour hands to desired positions while viewing the LCD 33.

By repeating steps 1007, 1014, and 1015, the user enters how much to move each hand. Before step 1015 for <DISPLAY THE LOCUS>, the <PAD ENTRY> is performed and further, the order in which the coordinates are entered is recorded in step 1014. This is a process in which vector information indicating how much, and in which direction, each hand is to be moved is processed.

FIG. 6(*d*) shows the process in which the locus is entered. In this display, the entered locus is displayed by an arrow to distinguish it from the hour and minute hands. The arrow display is performed by adding an arrow, not to the start point of the locus entry, but to the last point of the locus entry.

When the user has entered the locus (or assessed) and single-presses the key, the vector is accepted and analyzed in step 1009. More specifically, it is determined which line is nearer to the arrow and which hand, minute or hour, the user is going to move.

Figure 6A:
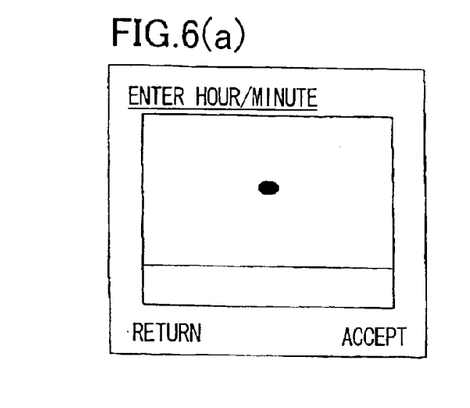
FIG. 6 is a diagram showing display screens illustrating operation steps for time entry on a cellular phone in an embodiment of the present invention.
Figure 6B:
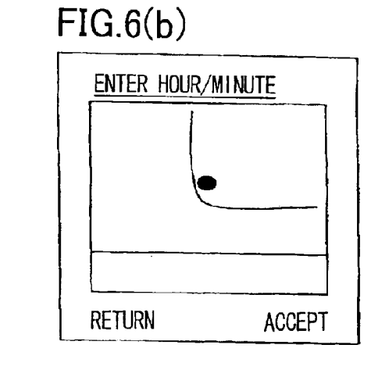
Figure 6C:
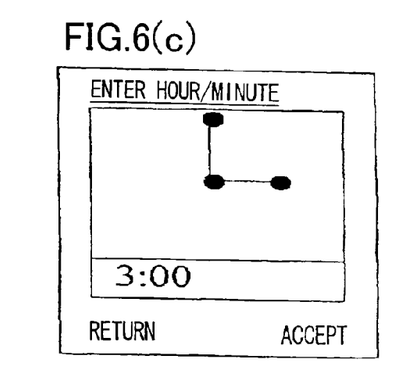
Figure 6D:
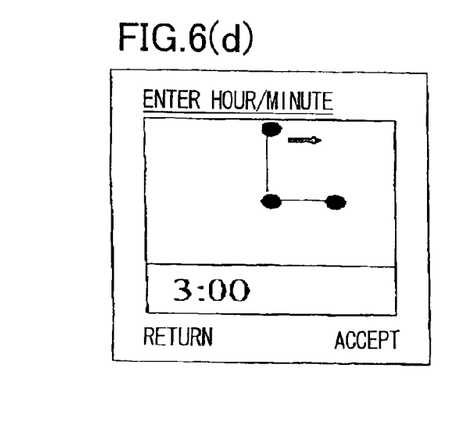
Figure 6E:
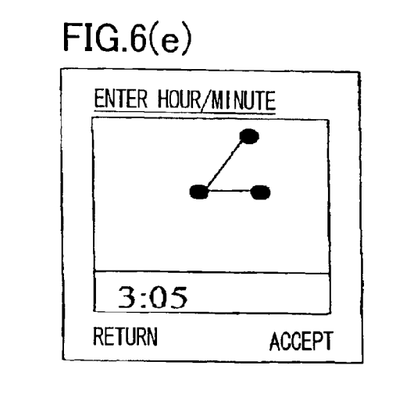
Figure 6F:
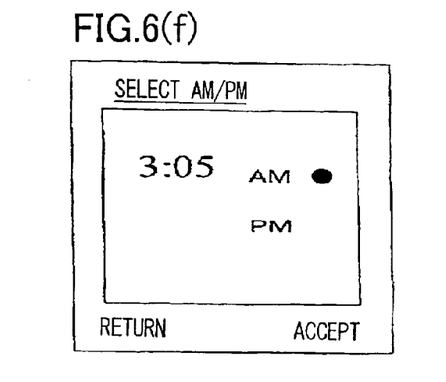

Next, the line length and direction and the coordinate entry sequence are converted to those in the rotation (polar) coordinate system for recognizing them in amounts of angular motion. Then, the hand selected according to the amount of angular motion is moved. In step 1010, the line is moved, and the graphic indicating the time after the hand has been moved is displayed on the LCD 33. FIG. 6(*e*) shows the graphic displayed at this time. The digital display value is also updated at this time.

Then, as shown in FIG. 6(*f*), the screen changes to the one on which the user selects either AM or PM to represent the time in the 12-hour format.

As described above, the cellular phone in this embodiment has the operation panel on the back to allow the user to select an operation and to enter a character easily.

Whether the user is left-handed or right-handed, he or she can touch the keys with the index finger. This means that the user can operate the cellular phone with no concern about which hand the user feels more comfortable in using the phone.

In the embodiment described above, a special touch panel entry processor is used to control input from the touch panel. Instead of this, an A/D converter for power voltage detection, usually provided on a cellular phone, or an A/D converter for detecting the reception electric field level may also be switched over on a time basis for controlling input from the touch panel.

Although in the embodiment described above, upward movement or downward movement is used in selecting information, the software of the touch panel entry processor may be modified to provide selection means that detect a horizontal movement or a clockwise or counterclockwise rotational movement.

Instead of allocating the Accept key as the operation switch of the cellular phone, the switch may also be provided on the touch panel. The software may also be modified so that information may be accepted either when there is no entry through the touch panel during a predetermined period of time after the user stroked the finger upward or downward or when the user strokes the finger horizontally.

Although an analog membrane touch panel is used in the embodiment described above, a digital touch panel having divided pixels of a checked pattern thereon may be used. In this case, as many interface lines as the number of elements of the checked matrix are necessary. However, there is no need for an A/D converter that is used as the detection circuit; instead, standard port interface for digital input may be used to detect digital logic signals.

Although the cellular phone is configured so that the user holds it with the left hand in the above embodiment, the Accept key and the Cancel key may be programmed to allow the user to customize their positions or the inverted character-entry processing may be selectively added. These functions, if added, eliminate the need for the user to worry about his or her dominant hand or personal handwriting in writing characters on the back of the phone.

Furthermore, the cellular phone may have the voice recognition function built-in to enable the user to accept or cancel a character via voice. Also, the cellular phone may be a folding-type phone. In this case, if the display is provided on the front of the part that is folded about hinges with the touch panel on the back and if the operation entry part is on the other part of the phone, then selection, acceptance, cancellation, and so on are preferably done through the touch panel.

The meritorious effects of the present invention are summarized as follows.

As described above, the cellular phone according to the present invention has the operation area on the back to enable the user to easily select items, to enter a character, and to control scrolling. This configuration eliminates the need for character entry and numeric keys, making the entry operation simpler. The cellular phone according to the present invention makes best use of the display area and operation area of a compact portable data terminal while increasing operability.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. A mobile terminal with an operation entry part and a display area on a front thereof, comprising:
    a touch panel provided on a back of the terminal to allow a user, while holding the terminal with a hand, to perform an entry operation with a finger of the hand holding the terminal;
    a recognition device recognizing a hand-entered information entered from said touch panel; and
    a display screen displaying said recognized information, said display screen being disposed in said display area, and
    a processor performing processing according to a position at which, or a manner in which, said user presses said touch panel, wherein pressing said touch panel once accepts said recognized information and pressing said touch panel twice selects the entry operation.

2. The mobile terminal as defined by claim 1, wherein said information comprises hand-written character.

3. The mobile terminal as defined by claim 1, further comprising:
    a detection device detecting a touch operation when said user touches and strokes said touch panel and for moving information or a pointer according to a movement of said finger on said touch panel, said information and paid pointer being displayed by said display.

4. The mobile terminal as defined by claim 1, further comprising:
    pointer device configured to move the pointer to a predetermined position according to the movement of said finger on said touch panel when said user strokes said touch panel with the finger and, when the user presses said touch panel in this state, to scroll the display screen in said display area vertically or horizontally.

5. The mobile terminal as defined by claim 1, further comprising a selecting device executing either at least one of selection, acceptance, and cancellation of an item displayed in said display area or a scroll of the display screen, according to a position at which, or a manner in which, said user presses said touch panel.

6. The mobile terminal as defined by claim 1, further comprising at least one switch on a front of said mobile terminal for controlling acceptance and cancellation of an entry operation through said touch panel, said switch each being provided at a position, when said user holds said mobile terminal with a hand, where the user can press the switch with a finger of the hand holding said mobile terminal.

7. The mobile terminal as defined by claim 6, wherein said at least one switch is disposed at a position that can be accessed by a finger other than an index finger of the hand, said position being on a front side or a side wall of the mobile terminal.

8. The mobile terminal as defined by claim 1, wherein a type of the hand-entered information or hand-written character entered through said touch panel includes at least one of (a) Japanese kana syllabary, (b) Japanese kanji, and (c) alphanumeric characters.

9. The mobile terminal as defined by claim 1, further comprising a recognition device recognizing graphic information from a locus of the graphic, when graphic information is entered through said touch panel.

10. The mobile terminal as defined by claim 9, further comprising an arrangement of a minute hand and a hour hand of a clock from the graphic information to provide time information from said entered locus.

* * * * *